(12) United States Patent
Holzapfel et al.

(10) Patent No.: US 8,619,266 B2
(45) Date of Patent: Dec. 31, 2013

(54) OPTICAL POSITION-MEASURING DEVICE

(75) Inventors: Wolfgang Holzapfel, Obing (DE); Florian Flossmann, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 142 days.

(21) Appl. No.: 13/236,250

(22) Filed: Sep. 19, 2011

(65) Prior Publication Data
US 2012/0099118 A1 Apr. 26, 2012

(30) Foreign Application Priority Data

Sep. 24, 2010 (DE) .......................... 10 2010 041 330

(51) Int. Cl.
*G01C 3/08* (2006.01)
*G01B 11/14* (2006.01)

(52) U.S. Cl.
USPC .......................................... 356/615; 356/4.09

(58) Field of Classification Search
USPC ........ 356/614, 615–625, 3–5.15; 250/559.29, 250/559.3
See application file for complete search history.

(56) References Cited

U.S. PATENT DOCUMENTS

| | | | | |
|---|---|---|---|---|
| 2,887,927 A | * | 5/1959 | Newton | 356/252 |
| 3,084,342 A | * | 4/1963 | Fuller et al. | 343/761 |
| 4,707,129 A | * | 11/1987 | Hashimoto et al. | 356/4.09 |
| 5,715,044 A | * | 2/1998 | Hayes | 356/5.09 |
| 6,147,748 A | * | 11/2000 | Hughes | 356/4.09 |
| 2006/0092428 A1 | * | 5/2006 | Holzapfel et al. | 356/499 |
| 2009/0109426 A1 | * | 4/2009 | Cramer et al. | 356/154 |
| 2013/0222791 A1 | * | 8/2013 | Steffey et al. | 356/72 |

FOREIGN PATENT DOCUMENTS

EP 0919830 A2 * 10/1998
EP 0 919 830 6/1999

OTHER PUBLICATIONS

T. Takatsuji, et al., "*Whole-viewing-angle cat's-eye retroreflector as a target of laser trackers*," Meas. Sci. Technol. 10: N87-N90 (1999).

* cited by examiner

*Primary Examiner* — Gregory J Toatley
*Assistant Examiner* — Dominic J Bologna
(74) *Attorney, Agent, or Firm* — Kenyon & Kenyon LLP (57) ABSTRACT

An optical position-measuring device includes a light source, a measuring reflector movable in space, a detection unit and a light-beam deflection unit that can align at least one beam of rays, emitted by the light source, in the direction of the measuring reflector. The light-beam deflection unit includes a cardan system having two cardan frames. A first cardan frame is adjustable by motor about a first axis of rotation, and a second cardan frame within the first cardan frame is adjustable by motor about a second axis of rotation oriented in a direction perpendicular to the first axis of rotation. The two axes of rotation intersect in a fixed reference point, at which a reference reflector is disposed. A plurality of mirrors are disposed rigidly on the cardan frames, so that the beam of rays can be pivoted about the fixed reference point via the mirrors during alignment.

13 Claims, 5 Drawing Sheets

OPTICAL POSITION-MEASURING DEVICE

CROSS-REFERENCE TO RELATED APPLICATIONS

The present application claims priority to Application No. 10 2010 041 330.5, filed in the Federal Republic of Germany on Sep. 24, 2010, which is expressly incorporated herein in its entirety by reference thereto.

FIELD OF THE INVENTION

The present invention relates to an optical position-measuring device.

BACKGROUND INFORMATION

Position-measuring devices are used to determine, with extreme precision, the relative position of a fixed point with respect to a moving point in space, usually via distance measurements and/or angle measurements. In this context, the moving point in space is assigned a measuring reflector, with which a beam of rays of the optical position-measuring device is aligned, and which is tracked in the course of the measurement. The position of the measuring reflector, and therefore the position of the moving point in space, may be determined based on the distance information and/or angle information obtained in this manner.

An optical position-measuring device is described in European Patent No. 0 919 830. This device has a light source, a stationary reference reflector, a measuring reflector movable in space, a detection unit and a light-beam deflection unit. A beam of rays emitted by the light source is able to be aligned in the direction of the measuring reflector via the light-beam deflection unit. To that end, the light-beam deflection unit includes a slide unit, which is mounted in a manner allowing it to swivel about the spherical reference reflector in a cardan system. The midpoint of the spherical reference reflector represents a fixed reference point. Furthermore, the light source, the detection unit as well as further components, which are necessary for the interferometric distance measurement between the reference reflector and the measuring reflector, are swiveled with the slide unit, as well. This arrangement has the disadvantage that components having mass, such as the light source, the detection unit, etc., which are also necessary for the interferometric distance measurement, must be swiveled together with the slide unit about the fixed reference point. This increases the demands on the support of the slide unit considerably.

If, as an alternative in such a device, it is provided to dispose the light source and/or the detection unit outside of the slide unit and, in each instance, to transmit the light beams via optical fibers, then further problems result. They are caused due to the fact that such optical fibers allow only a certain bending radius. As a consequence of the only relatively large bending radii allowed, the required space for such a device increases considerably.

SUMMARY

Example embodiments of the present invention provide an optical position-measuring device which has simple and compact light-beam deflection unit, via which a beam of rays is aligned with a measuring reflector.

According to example embodiments of the present invention, an optical position-measuring device has a light source, a measuring reflector movable in space, a detection unit as well as a light-beam deflection unit via which at least one beam of rays, emitted by the light source, is alignable in the direction of the measuring reflector. The light-beam deflection unit includes a cardan or gimbal system having two cardan frames, of which a first cardan frame is adjustable by motor about a first axis of rotation, and a second cardan frame within the first cardan frame is adjustable by motor about a second axis of rotation oriented in a direction perpendicular to the first axis of rotation. The two axes of rotation intersect in a fixed reference point, at which a reference reflector is disposed. A plurality of mirrors are rigidly disposed on the cardan frames, so that during the alignment with the measuring reflector, the beam of rays is able to pivot about the fixed reference point via the plurality of mirrors.

According to example embodiments of the present invention, it is provided that: the beam of rays is incident along the first axis of rotation of the first cardan frame; the beam of rays is deflected away from the first axis of rotation by the first mirror in the beam path; by the last mirror in the beam path which is associated with the first axis of rotation, the beam of rays falling on it is deflected in the direction of the second axis of rotation of the second cardan frame; and by the last mirror in the beam path which is associated with the second axis of rotation, the beam of rays falling on it is deflected in the direction of the fixed reference point.

The light source may be stationary, and a beam of rays emitted by the light source may be suppliable to the measuring reflector via the light-beam deflection unit.

In the same manner, the detection unit may be stationary, and the beams of rays reflected back by the reference reflector and the measuring reflector may be suppliable to the detection unit.

It is possible to form the reference reflector as a spherically symmetrical retroreflector or as a triple prism or triple mirror.

The first cardan frame may be coupled to a first drive, and the second cardan frame may be coupled to a second drive.

In this context, it may be provided to form each of the drives as a piezo direct drive.

According to example embodiments of the present invention, it may be provided that: a first mirror in a light-entry area of the light-beam deflection unit is disposed on the first cardan frame, upon the first axis of rotation; a second mirror in the bearing region of the second cardan frame is disposed centrically with respect to the second axis of rotation, on the first cardan frame; a third mirror is disposed centrically with respect to the second axis of rotation, on the second cardan frame; and a fourth mirror is disposed on the second cardan frame outside of the second axis of rotation.

It is further possible: to assign at least two mirrors to the first cardan frame, the first of these mirrors in the beam path being placed upon the first axis of rotation, and the last of these mirrors in the beam path being placed outside of the first axis of rotation, upon the second axis of rotation; and to assign at least two mirrors to the second cardan frame, the first of these mirrors in the beam path being placed upon the second axis of rotation, and the last of these mirrors in the beam path being placed outside of the second axis of rotation.

In this context, the last mirror in the beam path on the first cardan frame may be disposed at a location upon the second axis of rotation of the second cardan frame, and be oriented so that the beam of rays falling on it is thereby deflected along the second axis of rotation.

Moreover, it may be provided that: all mirrors in the beam path, with the exception of the last mirror on the second cardan frame, are disposed so that they are oriented such that in each case, the beam of rays falling thereon is deflected in the direction of the respective following mirror in the beam path; and the last mirror on the second cardan frame is disposed so that it is oriented such that the beam of rays falling on it is thereby deflected in the direction of the fixed reference point.

The first drive may permit the first cardan frame to rotate about first axis of rotation by at least 360°, and the second drive may permit second cardan frame to rotate about second axis of rotation by at least 90°.

The detection unit may include a sensor element which senses the lateral deviation of the beam of rays, reflected back by the measuring reflector, from the fixed reference point, and converts it into a deviation signal; and a control and evaluation unit may be provided such that driving signals are able to be generated for the first and second drives based on the deviation signal, in order to minimize the lateral deviation by adjusting the first and/or second cardan frame about the first and/or second axis of rotation.

In the optical position-measuring device, the mass of the moving components of the light-beam deflection unit may be reduced considerably. Only small-sized and light mirrors must be swiveled with the movable cardan frames of the cardan system provided. In this connection, simple plane mirrors may be used, which may be obtained inexpensively. Because of the smaller moving masses, the demands on the support of the movable components of the light-beam deflection unit may therefore be reduced considerably, as well. This results in reduced manufacturing costs for the device.

The necessity of using optical fibers for transmitting beams of rays to and from the light-beam deflection unit is also eliminated. The restrictions associated with that with regard to physical size may be avoided with the device described herein, that is, the device may be compact.

Further features and aspects of example embodiments of the present invention are described in more detail below with reference to the appended Figures.

DETAILED DESCRIPTION

Figure 1:
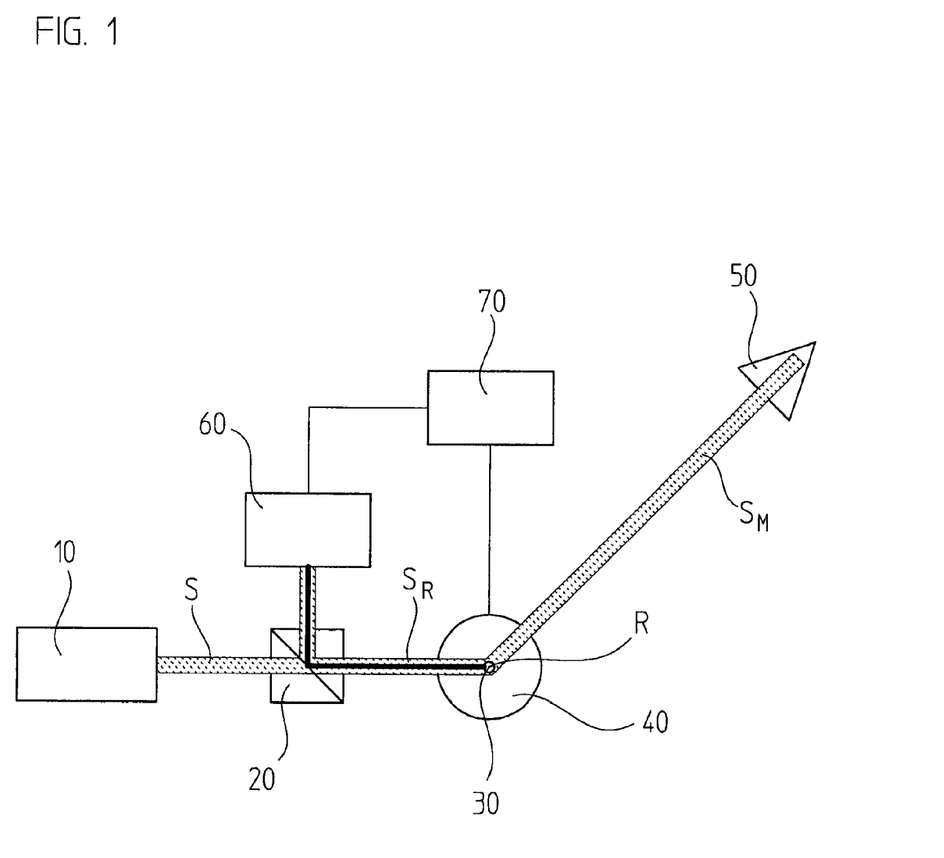
FIG. 1 schematically illustrates an optical position-measuring device according to an example embodiment of the present invention.

FIG. 1 schematically illustrates an optical position-measuring device according to an example embodiment of the present invention. Only a few functional blocks of the overall device are illustrated, e.g., the light-beam deflection unit is subsequently described in detail on the basis of the remaining figures.

In the exemplary embodiment illustrated, the optical position-measuring device includes a light source 10, a beam-separation unit 20, a stationary reference reflector 30, a light-beam deflection unit 40, a measuring reflector 50 movable in space, a detection unit 60 as well as a control and evaluation unit 70.

Beam of rays S, emitted by a light source 10, e.g., in the form of a laser, initially passes, unaltered, through beam-separation unit 20. For example, it may take the form of a polarizing beam splitter with assigned lambda/4 delay plate.

In light-beam deflection unit 40, beam of rays S subsequently strikes a reference reflector 30 centrally located there. Reference reflector 30 reflects a portion of incoming beam of rays S, namely, as beam of rays $S_R$, in a direction opposite the direction of incidence, back again to beam-separation unit 20. Thus, the reference arm for the interferometric distance measurement provided is formed via reflected-back beam of rays $S_R$. As illustrated in FIG. 1, reference reflector 30 is arranged as a spherically symmetrical reference reflector having retro-reflecting properties. At least a portion of beam of rays S falling on it is focused onto a reflective spherical inner surface, and from there, is reflected back as reference beam of rays $S_R$ in the direction of incident beam of rays S. The center of spherical reference reflector 30 coincides with a fixed reference point R. The portion of incident beam of rays S not reflected by reference reflector 30 propagates further as beam of rays $S_M$ in the direction of measuring reflector 50, and thus forms the measuring arm for the interferometric distance measurement.

Spherical reference reflector 30 may be made of a transparent sphere coated on one side with a reflective material, the sphere material having the refractive index n=2. In this regard, reference is made to the publication "Whole-Viewing-Angle Cat's Eye Retroreflector as a Target of Laser Trackers," Toshiyuki Takatsuji et al., 1999, Meas. Sci. Technol. 10 N87.

Reference reflector 30 may also be formed as a triple mirror or as a triple prism.

Moreover, further configurations are possible for reference reflector 30. With regard to the optical function of reference reflector 30, it is only necessary that a portion of incident beam of rays S be reflected back by it again in the direction of beam-separation unit 20.

As already mentioned above, the respective center of reference reflector 30 is also denoted hereinafter as fixed reference point R.

Beam of rays $S_M$ forming the measuring arm is deflected or oriented via light-beam deflection unit 40 into the direction of measuring reflector 50 movable in space. The specific formation of light-beam deflection unit 40 provided for that purpose is explained in more detail below. Beam of rays $S_M$ is aligned with measuring reflector 50 via the light-beam deflection unit such that in so doing, beam of rays $S_M$ is continually pivoted about fixed reference point R.

From measuring reflector 50, beam of rays $S_M$ falling on it is reflected back in a direction opposite to the direction of incidence and arrives via light-beam deflection unit 40 at beam-separation unit 20 again. In this context, measuring reflector 50 is assigned to that point in space whose position is to be detected via the optical position-measuring device. The same variants of retro-reflecting optical elements come into consideration as measuring reflector 50 as in the case of reference reflector 30, thus, for example, spherical measuring reflectors, triple mirrors or triple prisms, etc.

Together with beam of rays $S_R$ from the reference arm, likewise reflected back to beam-separation unit 20, beam of rays $S_M$ of the measuring arm finally propagates in the direction of detection unit 60. In the case of a relative-measuring interferometer variant, in response to changes in distance between stationary reference reflector 30 or reference point R and measuring reflector 50 movable in space, an interference signal results at detection unit 60 which represents a measure for the change in distance that has taken place. For the purpose of detection, detection unit 60 preferably includes a plurality of electro-optical detector elements, via which a plurality of phase-shifted interference signals are ascertainable.

The interference signals generated via detection unit 60 are further processed by a downstream control and evaluation unit 70. For instance, it may take the form of a suitable computing device, via which the interference signals are offset, and the distance and/or changes in distance between reference reflector 30 or reference point R and measuring reflector 50 are determined.

In general, various interferometric measuring principles may be used in the device described herein. For example, both relative-measuring principles, which determine only changes in distance, or else absolute-measuring principles, which permit the direct determination of the distance between reference reflector 30 or reference point R and measuring reflector 50, are suitable. From the measurement of several distances, changes in distance and/or angles, the three-dimensional position of the measuring reflector, that is, of the spatial point of interest, is able to be determined with the aid of control and evaluation unit 70.

In addition to determining distance and possibly position, control and evaluation unit 70 also assumes the control of drives of light-beam deflection unit 40, in order in this manner to make beam of rays $S_M$ in the measuring arm follow measuring reflector 50 movable in space. To that end, detection unit 60 includes at least one sensor element which senses the possibly existing lateral deviation of beam of rays $S_M$, reflected back by measuring reflector 50, from fixed reference point R, and converts it into a deviation signal. Control and evaluation unit 70 is configured such that driving signals are able to be generated for the drives of light-beam deflection unit 40 based on the deviation signal, in order to thereby minimize the lateral deviation sensed, and thus to make beam of rays $S_M$ in the measuring arm follow measuring reflector 50 in space.

Figure 2A:
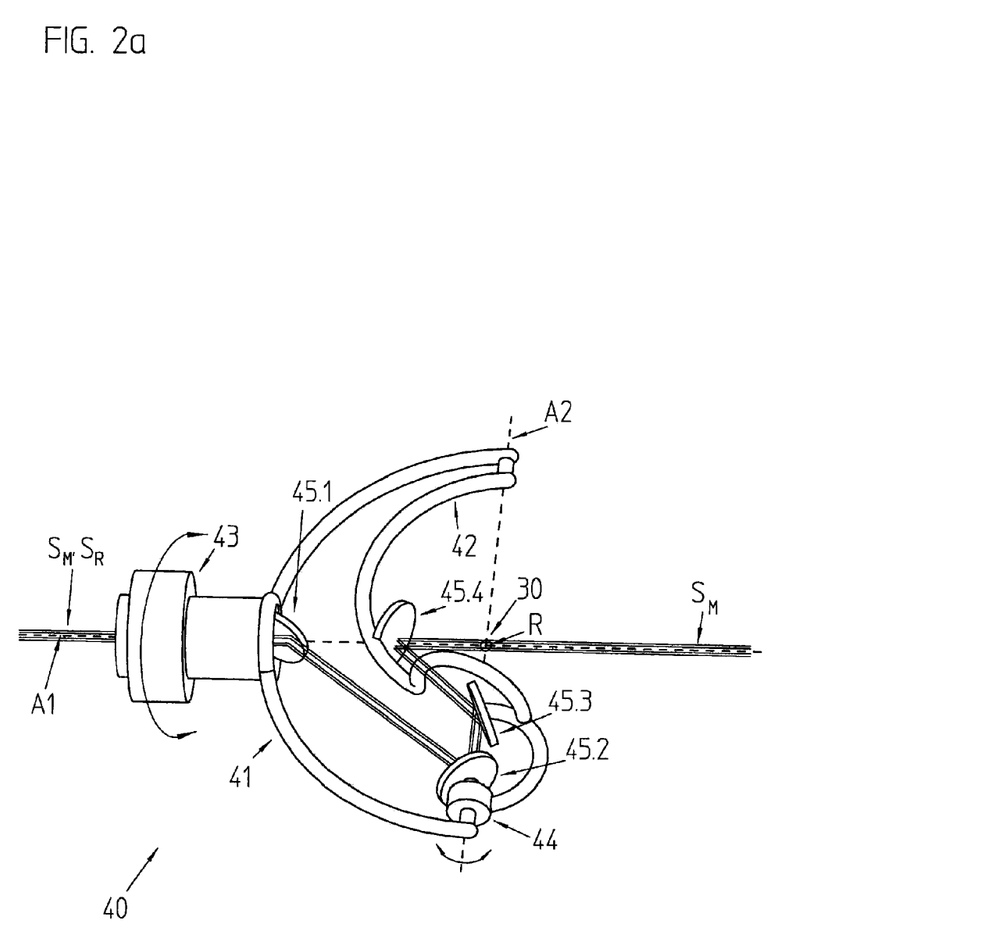
FIGS. 2a, 2b each illustrate a perspective view of parts of the light-beam deflection unit of the optical position-measuring device illustrated in FIG. 1 for different positions of the measuring reflector.
Figure 2B:
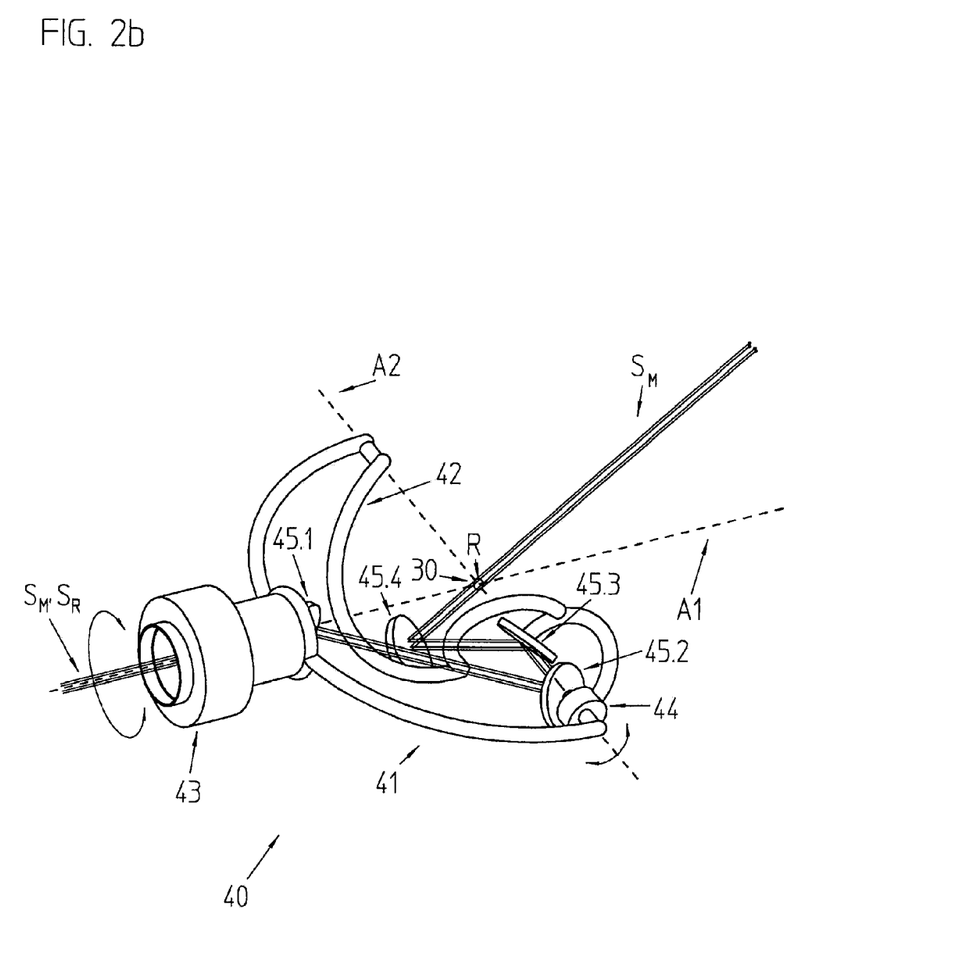

The light-beam deflection unit of the optical position-measuring device according to an example embodiment of the present invention is described in more detail with reference to the further Figures. FIGS. 2a and 2b each illustrate a perspective view parts of such a light-beam deflection unit 40, as may be used in the optical position-measuring device illustrated in FIG. 1. The two FIGS. 2a and 2b differ in the alignment of beam of rays $S_M$, in the measuring arm thereby deflected, which propagates in the direction of the measuring reflector, not shown in these figures.

Light-beam deflection unit 40 of the device includes a cardan or gimbal system having a first cardan frame 41 and a second cardan frame 42. First cardan frame 41 is adjustable, or more precisely, is able to be swiveled by motor about a first axis of rotation A1 via drive 43. Second cardan frame 42 is motor-adjustable within first cardan frame 41 about a second axis of rotation A2 via drive 44. Preferably, the two drives 43, 44, coupled to cardan frames 41, 42, are implemented as piezo direct drives. Axes of rotation A1, A2 of the two cardan frames 41, 42 are oriented perpendicularly relative to each other and, as evident, intersect in fixed reference point R at which the reference reflector is located, as explained above. The latter is represented in schematized fashion in FIGS. 2a, 2b as a small sphere in the beam path.

In the present example, a total of four mirrors 45.1 to 45.4, implemented as simple plane mirrors, are disposed rigidly on the two cardan frames 41, 42. Reference is made to the following description for their exact placement. Beam of rays $S_M$, incoming from the left along first axis of rotation A1 in FIG. 2a, is deflected via various mirrors 45.1 to 45.4 of light-beam deflection unit 40, such that during the alignment with the measuring reflector, this beam of rays $S_M$ is continuously pivoted about fixed reference point R. Thus, regardless of the position of the measuring reflector in space, beam of rays $S_M$ aligned with it always sweeps over fixed reference point R due to the selected design of light-beam deflection unit 40. This is to be illustrated based on the two FIGS. 2a and 2b, in which in each case, beam of rays $S_M$ is aligned with different positions in space. In both cases, in the alignment with different spatial positions of the measuring reflector, beam of rays $S_M$ is pivoted about fixed reference point R.

By the defined adjustment or swiveling of the two cardan frames 41, 42 about the two axes of rotation A1, A2, beam of rays $S_M$ is therefore able to be aligned with the measuring reflector, movable in space, and made to follow it. In this manner, an extremely precise interferometric distance measurement between any points in space and fixed reference point R is possible.

Due to the configuration of light-beam deflection unit 40, it is possible for the light source and the detection unit to be disposed in static or stationary fashion. After the splitting into beams of rays $S_R$, $S_M$ carried out at reference reflector 30 and the subsequent retroreflection of beams of rays $S_M$, $S_R$ at the reference reflector and at the measuring reflector, they are finally supplied to the detection unit via light-beam deflection unit 40. As evident from FIGS. 2a, 2b, both the feeding of beams of rays $S_M$, $S_R$ to light-beam deflection unit 40 and the feeding of reflected beams of rays $S_M$, $S_R$ to the stationary detection unit take place along first axis of rotation A1 of first cardan frame 41. Due to the stationary arrangement of the light source and the detection unit, the mass of the movable components in light-beam deflection unit 40 may be reduced considerably in the device described herein.

For clarity, only the further beam path of beam of rays $S_M$ by which the measuring arm is formed and which is aligned with the measuring reflector is depicted within light-beam deflection unit 40. Accordingly, at least beam of rays $S_M$ experiences the deflection effects within light-beam deflection unit 40 explained below.

As illustrated in FIGS. 2a, 2b, in the exemplary embodiment shown, beams of rays $S_M$, $S_R$ enter light-beam deflection unit 40 along first axis of rotation A1 of first cardan frame 41. In the light-entry area of light-beam deflection unit 40, a first mirror 45.1 is disposed rigidly on first cardan frame 41 upon first axis of rotation A1. By first mirror 45.1 in the beam path, beams of rays $S_M$, $S_R$ falling on it are deflected away from first axis of rotation A1 in the direction of a second mirror 45.2 outside of first axis of rotation A1.

In the bearing region of second cardan frame 42, second mirror 45.2 is disposed rigidly on first cardan frame 41, in centric fashion with respect to second axis of rotation A2. Thus, mirror 45.2 does not rotate about second axis of rotation A1 when second cardan frame 42 is swiveled. By second mirror 45.2, beams of rays $S_M$, $S_R$ falling on it are deflected in the direction of second axis of rotation A2, i.e., in the direction of third mirror 45.3. In general, last mirror 45.2 in the beam path on first cardan frame 41 is disposed at a location upon second axis of rotation A2 of second cardan frame 42, and is oriented such that beams of rays $S_M$, $S_R$ falling on it are thereby deflected along second axis of rotation A2.

Third mirror 45.3 is disposed on second cardan frame 42 in centric fashion with respect to second axis of rotation A2. If second cardan frame 42 rotates about second axis of rotation A2, third mirror 45.3 therefore rotates with it about second axis of rotation A2. Finally, by the third mirror, beams of rays $S_M$, $S_R$ falling on it are deflected in the direction of a fourth mirror 45.4.

Fourth mirror 45.4 is disposed rigidly on second cardan frame 42, outside of second axis of rotation A2. By fourth mirror 45.4, beams of rays $S_M$, $S_R$ falling on it are ultimately deflected in the direction of fixed reference point R.

In the placement of various mirrors 45.1 to 45.4 on the two cardan frames 41, 42, care must be taken that all mirrors 45.1 to 45.3 in the beam path, with the exception of last mirror 45.4 on second cardan frame 42, are oriented such that in each case they deflect beams of rays $S_M$, $S_R$ falling on them in the direction of the next-following mirror in the beam path. On the other hand, last mirror 45.4 on second cardan frame 42 is oriented such that beams of rays $S_M$, $S_R$ falling on it are thereby deflected in the direction of fixed reference point R.

In the exemplary embodiment illustrated, this placement of various mirrors 45.1 to 45.4 on the two motor-adjustable cardan frames 41, 42 ensures that during the alignment of beam of rays $S_M$ with the measuring reflector, this beam of rays $S_M$ is always pivoted about fixed reference point R. In every spatial position of the measuring reflector reachable by beam of rays $S_M$, beam of rays $S_M$ of the measuring arm therefore sweeps over reference point R. In this context, the aligning and tracking of beam of rays $S_M$ in terms of the measuring reflector are accomplished in light-beam deflection unit 40 by the defined adjustment of both cardan frames 41, 42 with the aid of both drives 43, 44. To that end, drives 43, 44 receive corresponding driving signals from the control and evaluation unit.

Figure 3:
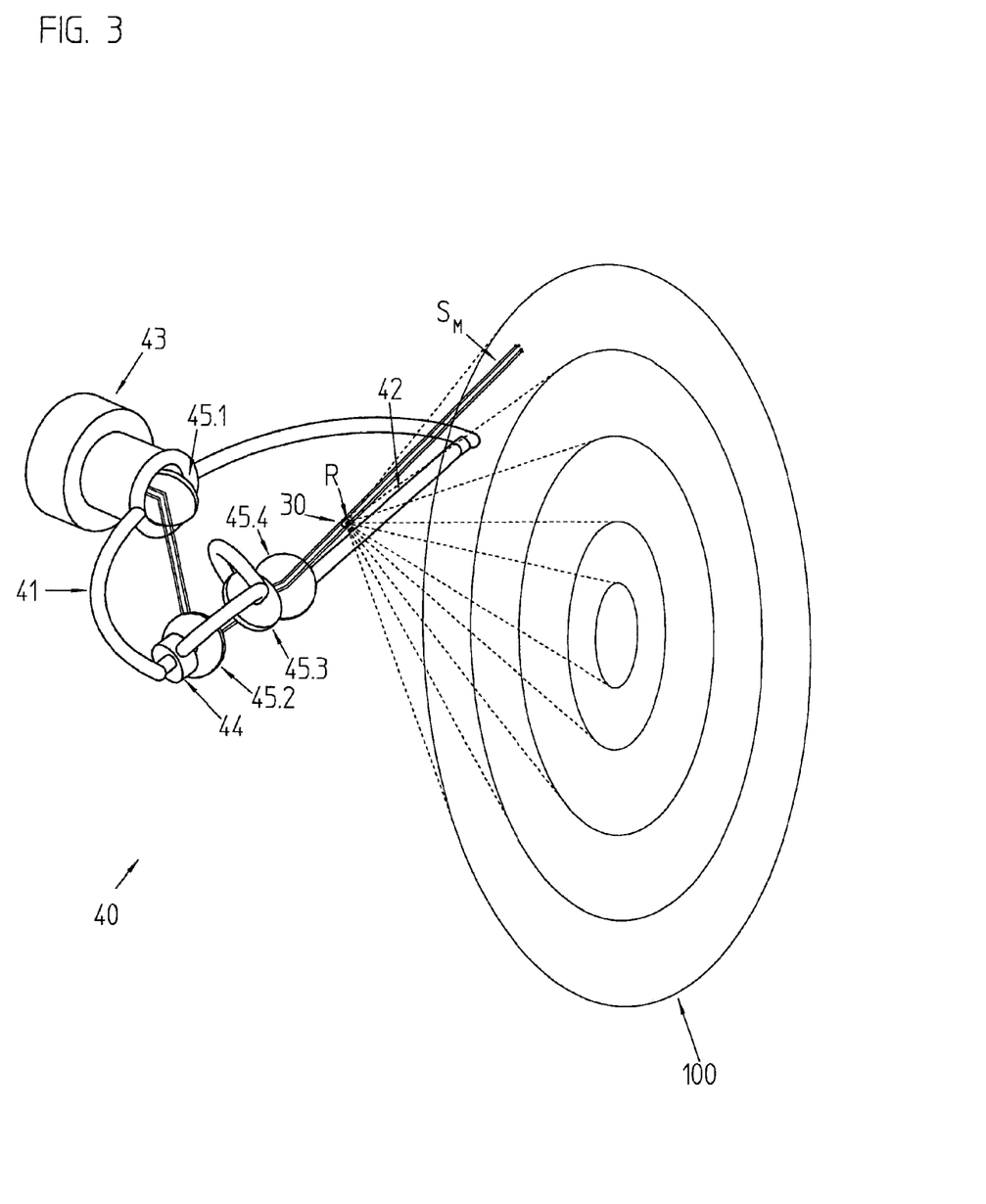
FIG. 3 illustrates the light-beam deflection unit illustrated in FIGS. 2a and 2b and the spatial area able to be raster-scanned by it.
Figure 4:
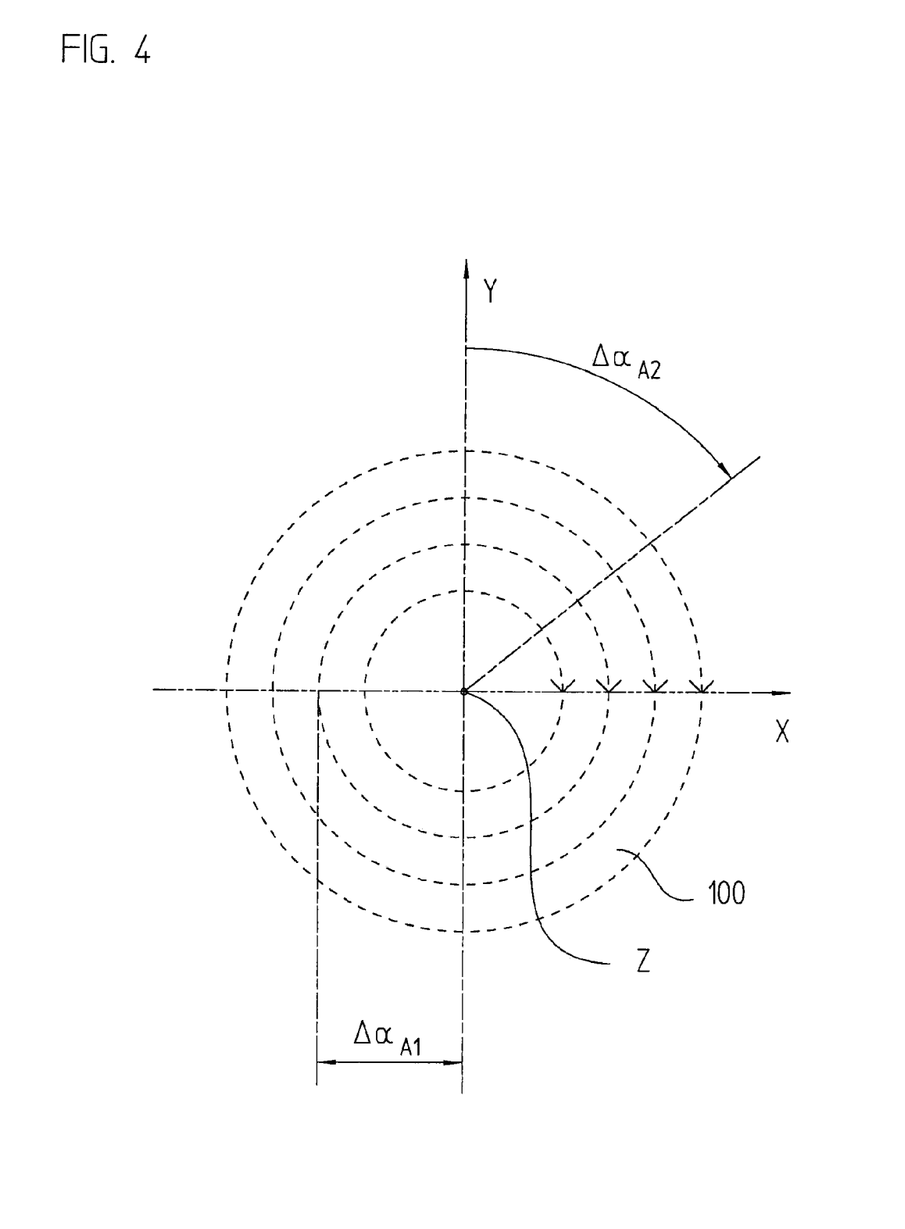
FIG. 4 illustrates a plane which is able to be acted upon by the deflected beam of rays.

With reference to FIGS. 3 and 4, in the following, it is explained how beam of rays $S_M$ is able to be aligned with the measuring reflector, movable in space, by the defined adjustment of both cardan frames 41, 42. FIG. 3 shows a spatial representation of light-beam deflection unit 40 previously described, as well as a plane which may be raster-scanned or scanned by beam of rays $S_M$ via the suitable twisting of both cardan frames 41, 42. FIG. 4 shows a two-dimensional view of this plane, having a plurality of scanning paths or scanning patterns that are able to be realized with the aid of light-beam deflection unit 40 according to FIGS. 2a, 2b. The reference numerals in FIG. 3 are selected to be identical to those from FIGS. 2a, 2b.

As FIG. 3 shows, light-beam deflection unit 40 permits the alignment of beam of rays $S_M$ in the sectional plane in a circular scanning region 100. The measuring reflector may be disposed at any position in this scanning region 100, and beam of rays $S_M$ may be directed toward the respective position by the suitable adjustment of both cardan frames 41, 42 about both axes of rotation A1, A2.

As illustrated in FIG. 4, the distance of the point of incidence of beam of rays $S_M$ striking in this plane from circle center Z is set via adjustment angle $\Delta\alpha_{A2}$ of second cardan frame 42 about second axis of rotation A2.

The azimuthal angular position of this point of incidence in the plane relative to a reference direction is set via adjustment angle $\Delta\alpha_{A1}$ of first cardan frame 41 about first axis of rotation A1.

Thus, any point of circular scanning region 100 is able to be reached by beam of rays $S_M$ in this sectional plane by defined adjustment of both cardan frames 41, 42 about first and second axes of rotation A1, A2. For complete coverage of this scanning region, in example embodiments, first drive 43 permits a rotation of first cardan frame 41 about first axis of rotation A1 by at least 360°, and second drive 44 permits a rotation of second cardan frame 42 about second axis of rotation A2 by at least 90°. In principle, however, other swivel ranges of cardan frames 41, 42 may also be provided. The scanning region to be raster-scanned is then possibly reduced.

In addition to the exemplary embodiment described and illustrated, it should be understood that there are alternative arrangements and configurations for the optical position-measuring device.

For example, the light-beam deflection unit described may be modified with regard to the number of mirrors used. For instance, it is also possible to provide more than just two mirrors per cardan frame in order to deflect the beam of rays. In particular, it may be provided to place further mirrors between first and second mirrors 45.1, 45.2 on first cardan frame 41, and it is possible to dispose additional mirrors in the beam path between third and fourth mirrors 45.3, 45.4 on the second cardan frame.

Moreover, it is possible to replace the mirrors preferably used for beam deflection, by alternative optical components suitable for beam deflection, For example, suitably formed prisms, reflection gratings or transmission gratings, optical wedge plates or combinations of such components, etc., are also possible.

It may further be provided to dispose diaphragms on one or more mirrors, which suitably limit the cross-section of the beam of rays falling on them, etc.

What is claimed is:

1. An optical position-measuring device, comprising:
   a light source adapted to emit a beam of rays;
   a measuring reflector movable in space;
   a reference reflector;
   a detection unit;
   a light-beam deflection unit adapted to align at least one beam of rays, emitted by the light source, in a direction of the measuring reflector, the light-beam deflection unit including a cardan system having a first cardan frame and a second cardan frame, the first cardan frame being motor-adjustable about a first axis of rotation, and the second cardan frame within the first cardan frame being motor-adjustable about a second axis of rotation oriented in a direction perpendicular to the first axis of rotation, the first axis of rotation and the second axis of rotation intersecting at a fixed reference point at which the reference reflector is located; and
   a plurality of mirrors arranged rigidly on the cardan frames, so that during alignment with the measuring reflector, the beam of rays is pivotable about the fixed reference point by the plurality of mirrors.

2. The optical position-measuring device according to claim 1, wherein:
   the beam of rays is incident along the first axis of rotation of the first cardan frame;
   the beam of rays is deflected away from the first axis of rotation by a first mirror in a beam path;
   by a second mirror in the beam path which is associated with the first axis of rotation, the beam of rays falling on the second mirror is deflected in a direction of the second axis of rotation of the second cardan frame; and
   by a fourth mirror in the beam path which is associated with the second axis of rotation, the beam of rays falling on the fourth mirror is deflected in a direction of the fixed reference point.

3. The optical position-measuring device according to claim 1, wherein the light source is arranged in stationary fashion, and a beam of rays emitted by the light source is suppliable by the light-beam deflection unit to the measuring reflector.

4. The optical position-measuring device according to claim 1, wherein the detection unit is arranged in stationary fashion, and the beams of rays reflected back by the reference reflector and the measuring reflector are suppliable to the detection unit.

5. The optical position-measuring device according to claim 1, wherein the reference reflector includes at least one of (a) a spherically symmetrical retroreflector, (b) a triple prism, and (c) a triple mirror.

6. The optical position-measuring device according to claim 1, wherein the first cardan frame is coupled to a first drive, and the second cardan frame is coupled to a second drive.

7. The optical position-measuring device according to claim 6, wherein each of the first drive and the second drive drives includes a piezo direct drive.

8. The optical position-measuring device according to claim 2, wherein:
   the first mirror in an area of the light-beam deflection unit is arranged on the first cardan frame, upon the first axis of rotation;
   the second mirror in a drive region of the second cardan frame is arranged concentrically with respect to the second axis of rotation, on the first cardan frame;
   a third mirror is arranged concentrically with respect to the second axis of rotation, on the second cardan frame; and
   the fourth mirror is arranged on the second cardan frame not along the second axis of rotation.

9. The optical position-measuring device according to claim 2, wherein
   the first and second mirrors are assigned to the first cardan frame, the first mirror in a beam path being arranged on the first axis of rotation, and the second mirror in the beam path being arranged not along the first axis of rotation, on the second axis of rotation;
   a third mirror and the fourth mirror are assigned to the second cardan frame, the third mirror in the beam path being arranged on the second axis of rotation, and the fourth mirror in the beam path being arranged not along the second axis of rotation.

10. The optical position-measuring device according to claim 9, wherein the second mirror is arranged at a location on the second axis of rotation of the second cardan frame and is oriented such that the beam of rays falling thereon is deflected along the second axis of rotation.

11. The optical position-measuring device according to claim 10, wherein:
    the first, second, and third mirrors in the beam path are oriented such that in each case, the beam of rays falling thereon is deflected in a direction of a respective following mirror in the beam path; and
    the fourth mirror is oriented such that the beam of rays falling thereon is deflected in a direction of the fixed reference point.

12. The optical position-measuring device according to claim 11, wherein:
    the first cardan frame is coupled to a first drive, and the second cardan frame is coupled to a second drive;
    the first drive is adapted to permit the first cardan frame to rotate about the first axis of rotation by at least 360°; and
    the second drive is adapted to permit the second cardan frame to rotate about the second axis of rotation by at least 90°.

13. The optical position-measuring device according to claim 6, wherein the detection unit includes a sensor device adapted to sense a lateral deviation of the beam of rays, reflected back by the measuring reflector, from the fixed reference point, and to convert the lateral deviation into a deviation signal, the device further comprising:
    a control and evaluation unit adapted to generate driving signals for the first drive and the second drive based on the deviation signal, in order to minimize the lateral deviation by adjusting at least one of (a) the first cardan frame and (b) the second cardan frame about at least one of (a) the first axis of rotation and (b) the second axis of rotation.

* * * * *